United States Patent Office 3,074,996
Patented Jan. 22, 1963

3,074,996
CYCLOHEXYLSULFAMIC ACID SALT
Henry M. N. Dickinson, Lake Bluff, Ill., assignor to Abbott Laboratories, North Chicago, Ill., a corporation of Illinois
No Drawing. Filed Apr. 18, 1960, Ser. No. 22,686
1 Claim. (Cl. 260—465)

The present invention relates to a new crystalline salt of α-(isopropyl)-α-(β-dimethylaminopropyl) - phenylacetonitrile. More particularly, the present invention relates to the cyclohexylsulfamic acid addition salt of the previously designated phenylacetonitrile base.

In the formulation of certain pharmaceutical preparations, it is highly desirable to have the active ingredient in a solid physical form. This is due to the fact that most solid forms of compounds have greater stability than the liquid forms, are easier to handle, and in some instances, are more readily adaptable to certain formulations, such as tablets.

The previously described base, namely, α-(isopropyl)-α-(β-dimethylaminopropyl) - phenylacetonitrile, is sold under the trademark Peracon, and is well known for its antitussive properties. In its normal physical form, α-(isopropyl)-α - (β-dimethylaminopropyl) - phenylacetonitrile is a heavy, syrupy liquid and is bitter to the taste. It is apparent that bitterness is a very undesirable characteristic for an antitussive agent when orally administered.

It is well recognized in the pharmaceutical art that a therapeutic agent in a liquid state cannot easily be compounded in a tablet dosage form. A solid form is therefore preferred. Further, while some solid salt forms of compounds are stable, others are hygroscopic and unstable in the tablet formulations.

All attempts to find a solid form of the previously described base by forming the usual acid addition salts such as the hydrochloride, the sulfate and the phosphate have failed to produce a solid product. Attempts to form salts with saccharin and fumaric acids also failed to yield a solid form of the present base.

It is therefore an object of the present invention to provide a therapeutically useful salt of α-(isopropyl)-α-(β-dimethylaminopropyl)-phenylacetonitrile which in its natural physical state is a solid product.

It is a further object of the present invention to provide a salt of the previously described base which has an improved taste.

It is still a further object of the present invention to provide a salt of α-(isopropyl)-α-(β-dimethylaminopropyl)-phenylacetonitrile which is stable and non-hygroscopic.

Other objects of the present invention will be apparent to one skilled in the art from the accompanying description and claim to follow.

It has now been found that upon formation of the cyclohexylsulfamic acid addition salt of α-(isopropyl)-α-(β-dimethylaminopropyl)-phenylacetonitrile, a therapeutically active compound is produced having the same antitussive properties as the corresponding base. Cyclohexylsulfamic acid, unlike most acids, hase a sweet-sour taste. It is sold under the name of Hexamic Acid®, a registered trademark of Abbott Laboratories. The novel salt of this invention has a mild, bittersweet taste which is much preferred over the strong, bitter taste of the base. In addition, the novel cyclohexylsulfamic acid addition salt is non-hygroscopic and therefore more stable.

The following specific examples are intended for the purpose of illustrating the present invention. They should not be construed as limiting the invention to the precise reactants, ingredients, or conditions specified.

*Example I*

α-(Isopropyl)-α-(β-dimethylaminopropyl) - phenylacetonitrile cyclohexylsulfamic acid

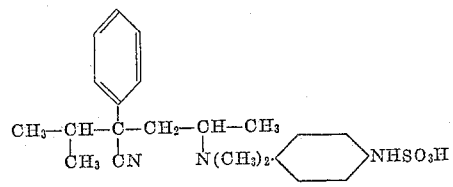

An aqueous mixture of cyclohexylsulfamic acid is prepared by slurrying 2.1154 gm. (0.0118 mole) of cyclohexylsulfamic acid in 5 ml. of water. To the resulting aqueous mixture is added, at room temperature, 2.8845 gm. (0.0118 mole) of α-(isopropyl)-α-(β-dimethylaminopropyl)-phenylacetonitrile. The reaction mixture is cooled and sufficient water is thereafter added to give a total volume of 10.0 ml. Upon completion of the reaction, a solid precipitate forms which is recovered by filtration to obtain the desired product, α-(isopropyl)-α-(β-dimethylaminopropyl)-phenylacetonitrile cyclohexylsulfamic acid.

*Analysis.*—Calc'd for $C_{22}H_{37}N_3O_3S$: C, 62.3%; H, 8.8%; N, 9.92%; S, 0.075%. Found: C, 62.05%, H, 8.95%; N, 9.95%; S, 0.076%.

*Example II*

This example illustrates the formulation of 2,000 tablets containing the novel salt of this invention as the active therapeutic agent. Tablets were made up to contain the following ingredients:

| Ingredient: | Amount in grams |
|---|---|
| α-(Isopropyl)-α - (β - dimethylaminopropyl)-phenylacetonitrile cyclohexylsulfamic acid_ | 50.0 |
| Lactose | 172.0 |
| Acacia, powdered | 5.6 |
| Talc | 5.6 |
| Starch | 12.0 |
| Magnesium stearate | 1.0 |
| Water | 20.0 |

The cyclohexylsulfamic acid salt is mixed with the lactose and thereafter added to a mixture of the acacia dissolved in 20 ml. of water. The resulting wet mixture is screened through a #10 mesh screen and dried at 105° F. The dried granulation is passed through a #20 mesh screen. The talc, the starch and the magnesium stearate, are passed through a #40 mesh screen and blended with the dried granulation. The blended mass is compressed on a 5/16 inch convex punch, and the compression weight for 10 tablets is 1.2310 gm.

*Example III*

This example illustrates the formulation of the novel cyclohexylsulfamic acid salt of this invention in a liquid cough preparation. In this example, an expectorant, such as ipecac, and an antitussive agent, as represented by applicant's novel salt, along with other ingredients are employed. The liquid preparation is formulated according to the following directions.

| Ingredient: | Amount |
|---|---|
| Benzoin compound solution, U.S.P.___ml__ | 24.00 |
| Sucrose _____gm__ | 672.74 |
| Sodium citrate, U.S.P._____gm__ | 50.00 |
| Ammonium chloride, U.S.P._____gm__ | 10.00 |
| FDC, red dye #1_____gm__ | 0.10 |
| Ipecac syrup, U.S.P._____ml__ | 2.00 |
| Glycerine _____gm__ | 52.29 |
| α-(Isopropyl)-α-(β - dimethylaminopropyl)-phenylacetonitrile cyclohexylsulfamic acid gm__ | 10.00 |
| Menthol, U.S.P., synthetic_____gm__ | 0.04 |
| Vanilla extract_____gm__ | 0.20 |
| Ethyl alcohol, U.S.P., 190 proof_____gm__ | 5.40 |
| Water, q.s._____ml__ | 1000 |

The benzoin solution is gradually added to 125 ml. of water with agitation. The resulting solution is allowed to stand for one hour and is filtered. The sucrose is dissolved in 225 ml. of boiling water and allowed to cool to room temperature. The filtered benzoin solution is then added to the sucrose solution along with the sodium citrate and the ammonium chloride. The red dye is dissolved in 8 ml. of water and the cyclohexylsulfamic acid salt is dissolved in 20 ml. of water and combined with the previously prepared solution to which is also added the ipecac and the glycerine. The menthol and the vanilla are dissolved in sufficient alcohol and also added. To the final mixture is added sufficient water to give a total volume of one liter and the mixture thereafter filtered.

Through this invention a tablet form of α-(isopropyl)-α-(β-dimethylaminopropyl)-phenylacetonitrile cyclohexylsulfamic acid is provided which is stable and non-hygroscopic.

As regards the use of the novel salt in a liquid preparation, a more palatable product is now provided. No longer must a large amount of flavoring agents be added to mask the bitter taste of the α-(isopropyl)-α-(β-dimethylaminopropyl)-phenylacetonitrile base, since the novel salt has a much milder, bittersweet taste.

Others may practice the invention in any of the numerous ways which will be suggested by this disclosure to one skilled in the art. All such practice of the invention is considered to be a part thereof provided it falls within the scope of the appended claim.

I claim:

The cyclohexylsulfamic acid addition salt of α-(isopropyl)-α-(β-dimethylaminopropyl)phenylacetonitrile.

References Cited in the file of this patent

UNITED STATES PATENTS 2,934,557    Stuhmer et al. _____ Apr. 26, 1960

OTHER REFERENCES

"The Condensed Chemical Dictionary," Fifth Edition, 1956, page 330.